United States Patent [19]
Ganzi et al.

[11] 4,067,794
[45] Jan. 10, 1978

[54] SEALING GASKET FOR CHAMBER WALL

[75] Inventors: Gary C. Ganzi, Lexington; Anil D. Jha, Littleton, both of Mass.

[73] Assignee: Ionics, Inc., Watertown, Mass.

[21] Appl. No.: 759,505

[22] Filed: Jan. 14, 1977

[51] Int. Cl.² .................. B01D 13/02; B65D 53/00; F16J 15/02
[52] U.S. Cl. .................. 204/301; 204/180 P; 277/4; 277/12; 277/75; 277/199
[58] Field of Search .................. 277/130–132, 277/70, 76, 77, 166, 4, 12, 136, 137, 235 B, 192, 79, 71, 75, 199, 180, 72 R, 198, 237 R, 72 FM, 182, 183; 204/255, 256, 269, 270, 301, 302, 180 P

[56] References Cited

U.S. PATENT DOCUMENTS

| | | | |
|---|---|---|---|
| 2,517,717 | 8/1950 | Rose | 277/192 X |
| 3,091,583 | 5/1963 | Schufle | 204/180 P X |
| 3,175,832 | 3/1965 | Carrell | 277/199 |
| 3,231,289 | 1/1966 | Carrell | 277/199 X |
| 3,582,488 | 6/1971 | Zeineh | 204/301 X |
| 3,657,099 | 4/1972 | Seko et al. | 204/269 X |
| 3,728,244 | 4/1973 | Cooley | 204/269 |
| 3,864,236 | 2/1975 | Lindstrom | 204/256 X |
| 3,933,617 | 1/1976 | Yamamoto et al. | 204/301 |
| 3,985,636 | 10/1976 | Schneider | 204/180 P X |

FOREIGN PATENT DOCUMENTS

| | | | |
|---|---|---|---|
| 735,415 | 5/1966 | Canada | 204/301 |
| 391,022 | 4/1933 | United Kingdom | 204/256 |

*Primary Examiner*—Robert S. Ward, Jr.
*Attorney, Agent, or Firm*—Norman E. Saliba; John M. Brandt

[57] ABSTRACT

A gasket for preventing fluid flow from the interior to the exterior of a chamber is disclosed in which tab members or projections from a body portion lockingly cooperate with corresponding recesses in the chamber wall. Transverse openings in the gasket body allow access to the interior of the chamber. The apparatus is particularly applicable as a means for sealing an electrode terminal extending from the interior to the exterior of an electrodialysis filter press stack.

13 Claims, 4 Drawing Figures

SEALING GASKET FOR CHAMBER WALL

BACKGROUND OF THE INVENTION

1. Field of the Invention:

The invention relates to gaskets and more particularly to gaskets for preventing the flow of a fluid from the interior to the exterior of a chamber comprising an electrochemical or electrodialysis filter press apparatus.

2. Description of the Prior Art:

Previous electrodes in similar electrodialysis devices were solid and self-supporting and thus extended to the exterior of the stack requiring only surface gaskets to prevent leakage between the interfaces of the component members of the stack. Newly employed porous or non-porous electrodes require a non-conducting support frame necessitating an access terminal running from the interior to the exterior of the stack. Leakage must be prevented at the frame terminal interface which is accomplished by the configuration of the present invention. The inventors know of no similar device disclosed in the prior art.

SUMMARY OF THE INVENTION

The invention may be summarized as a gasket for preventing fluid flow or leakage from the inside of a chamber to the outside at a point in the chamber wall where it is desired to position a conduit for communicating with the interior of the chamber. The gasket is composed of a main body portion and a pair of tabs extending from opposite sides of the body. The body fits into an opening of corresponding shape in the chamber wall and the tabs are arranged to fit into corresponding recesses adjacent to the opening. The fit is sufficiently close such that at least a portion of the tabs and the recesses lockingly cooperate to form a seal to prevent leakage at the interface of the tabs and the recesses.

The gasket is preferably formed of an elastomeric material such as neoprene which will deform under pressure. Openings for communicating with the interior of the chamber may pass through the body portion of the gasket into which conduits may be inserted. Devices for transmitting fluids, pipes for example, or electrical energy, electrode terminals for instance, are two types of conduits which can be used. Bonding material is used to adhere the gasket and conduit.

The invention is particularly suited for use in an electrodialysis filter press stack in which it is necessary to seal electrode terminals extending outside the stack against fluid leakage from the interior. In these structures ion exchange membranes are alternately arranged between cell frames and spacers that are assembled into a stack between cathode and anode electrodes. Through a system of manifolding, liquid is passed into and out of each of the cell frames. Rubber sheet gaskets are employed between various frame and spacers to prevent liquid leakage between the surface interfaces of those members to the outside of the stack. The gaskets are disposed around the outside perimeters of the frames. Electrodes are located within the cutout central portions of specific electrode frames which support and position the electrodes. A portion of an electrode must pass to the outside of the stack to function as a terminal for an external power source. The stack is assembled and held in place by lateral pressure applied to each end.

Leakage is often encountered in the area of an electrode terminal when prior art gaskets mentioned above are employed. This is most likely attributable to deformation and separation at gasket-frame-electrode-terminal interfaces produced by the stack assembly pressure. It is also attributable to frame dimension changes due to age, thermal expansion and contraction, and to exposure to chemicals and oxidation. This is particularly true of the transverse frame-electrode terminal interfaces as opposed to the surface interfaces.

The present invention, when employed as a sealing gasket between frame and electrode in such a stack, increases in sealing ability as lateral pressure increases, since the tab members expand outward to further fill and engage their corresponding frame recesses resulting in the prevention of edge leakage.

It should be understood, however, that in the broadest sense, lateral pressure is not necessary to cause the gasket to seal against fluid flow providing the fit between the gasket tabs and the frame or chamber wall recesses is sufficiently tight and the internal fluid pressure is not too great. Nor should the invention be considered as limited to the above described electrodialysis apparatus, since the concept, delineated below in detail in the drawing and description of the preferred embodiment, will find application in a wide variety of devices.

DESCRIPTION OF THE PREFERRED EMBODIMENT

Figure 1:
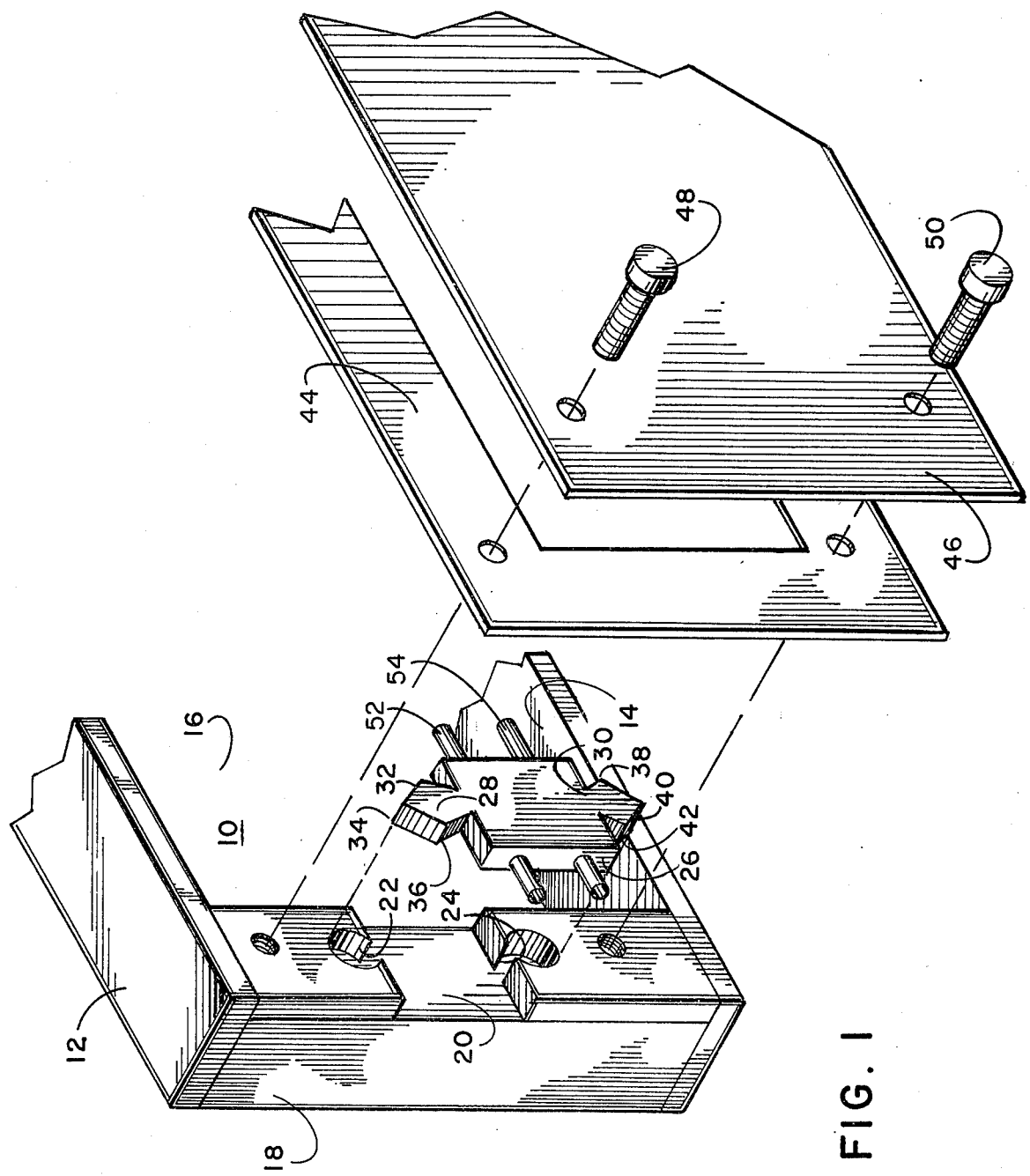
FIG. 1 is a perspective exploded view of a preferred embodiment of the invention.

Referring first to FIG. 1, there is shown a perspective, exploded view of the apparatus which employs and constitutes a preferred embodiment of the invention. An enclosed chamber 10 formed from walls 12, 14, 16, 18 and others not shown is designed for holding fluids for any purpose suitable to the user. Wall 18 has opening 20 extending transverse the wall with adjacent recesses 22 and 24 at opposite sides of the opening. Gasket 26, approximately equal to or just slightly thicker than wall 18 and consisting of body portion 26 and tab members 28 and 30, is arranged to fit into opening 20 and recesses 22 and 24. The tab portions are adapted to deform slightly to fit securely in the recesses at their extremities or interface points but it is not required or desired that the tabs completely fill the recesses.

In the embodiment illustrated, the surface of the gasket and those of the corresponding opening and recesses are planar. Although this is the most likely configuration, any surface shape, a curved surface for example, should function equally well providing the surface of the gasket and opening and recesses closely mate.

Upon positioning gasket 26 in opening 20, edges 32, 34, and 36 of tab 28 and edges 38, 40, and 42 of tab 30 will press firmly against the peripheral surfaces of their corresponding recesses 22 and 24. Sheet gasket 44 and side plate 46 are secured to the side of the chamber by bolts 48 and 50 and others not shown to complete the enclosure. Although substantial sealing is accomplished by the initial force fit of the tabs within the recesses, anchoring the plate squeezes the surface of gasket 26 causing the tabs to deform further and press more securely against the recess surfaces further accomplishing the sealing of the chamber against leakage past the interface of the tab edges and the recesses. Although practically all leakage is stopped at edges 32 and 38, any fluid flow outward past edges 32 and 38 would be further inhibited by the seal provided by edges 34 and 40, as edges 36 and 42 would further act to prevent leakage of any fluid which escaped the seal at edges 34 and 40.

Conduits 52 and 54 passing through gasket body 26 provide, for example, an inlet and outlet for controlled fluid flow as would be appropriate to the designated use of the chamber. Similarly, an electrode terminal may pass through the gasket as is required in the electrodialysis apparatus shown in FIG. 2.

Figure 2:
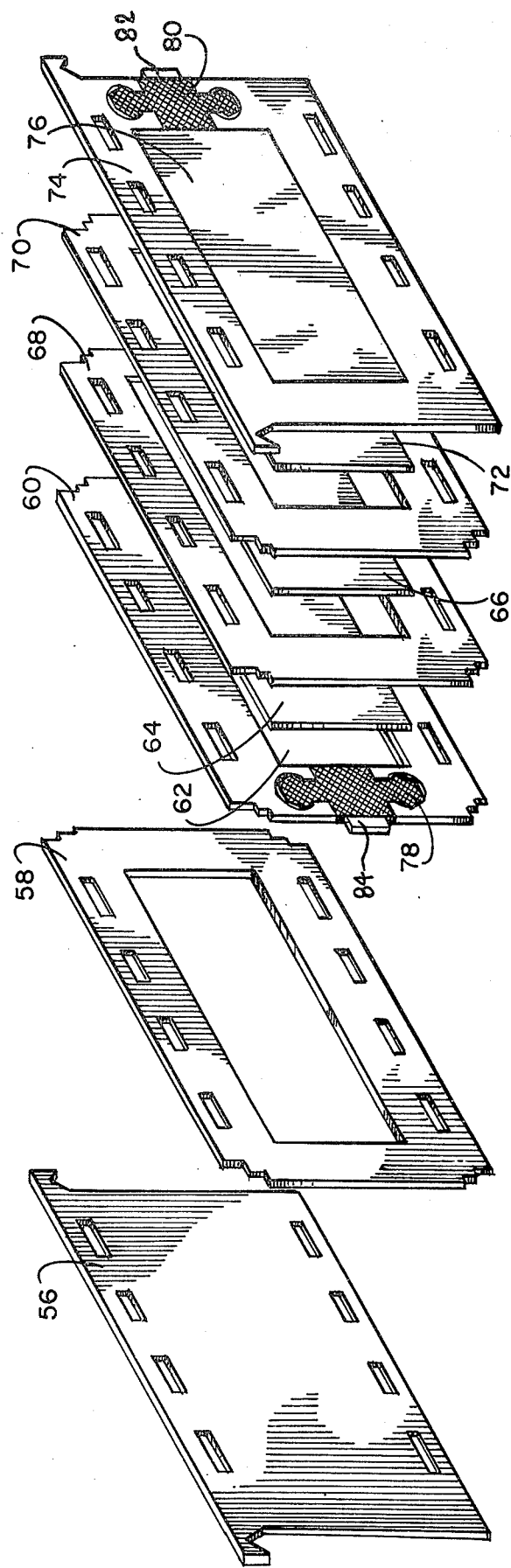
FIG. 2 is a perspective exploded view of an alternative preferred embodiment of the invention.

FIG. 2 illustrates an expanded portion of an electrodialysis filter press consisting of an end block 56, an end block gasket 58, a cathode frame 60, a cathode 62, cathode ion exchange membrane 64, central membrane 66, gasket frames 68 and 70, anode ion exchange membrane 72, and anode frame 74 and anode 76. Futher cells are added to the apparatus by supplying additional sets of the components delineated above. In operation, the entire assembly is forced together by hydraulic press means not shown, and appropriate solutions are injected into and withdrawn from the apparatus by pump and piping not shown. Internal flow of the chemical solution is controlled and organized by the plurality of rectangular ports visible in each of the gaskets and frames. Depending upon the desired routing, some ports have access to the interior of the frames by channels in the bodies of the frames, also not shown. Thus solutions undergoing chemical change by electrodialysis, flow through the press and are acted upon by the electrical states of the cathode and anode and by the differentiating abilities of the ion exchange membranes.

The end block is comprised of a hard material such as PVC, the gaskets of a flexible material, noeprene for example, and the electrodes of porous expanded metal, such as nickel. Gaskets 78 and 80 are of the type which comprise the invention as described above and function in an entirely similar nature, i.e. transverse or interior to exterior leakage of solutions passing through the press is prevented at the electrode-frame interface by interposing gaskets 78 and 80 between those components. Anode terminal 82 and cathode terminal 84 pass through their respective gaskets for connection to an appropriate power source not shown.

Figure 3:
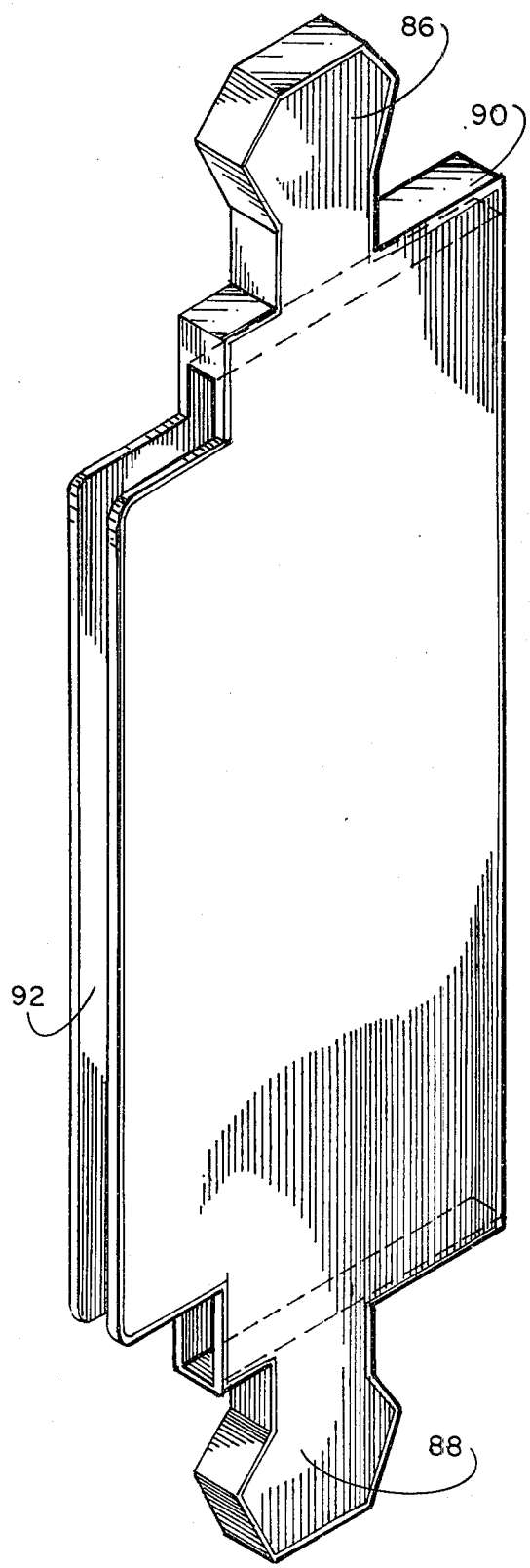
FIG. 3 is an enlarged perspective view of a portion of FIG. 2.

The gaskets are shown in more detail in FIG. 3 wherein tabs 86 and 88 extend from the main body 90 which has a substantial aperture 92 for receiving an electrode terminal. The tabs are shown as having four edges for interfacing with an appropriate frame recess.

Figure 4:
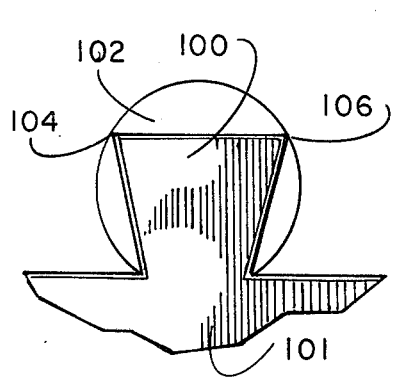
FIG. 4 is a plan view showing an alternative construction of the apparatus of FIG. 3.

FIG. 4 illustrates an alternative tab configuration for the type of gasket described in the previous figures. Tab 100 attached to body 101 fits into recess 102 contacting the recess at points 104 and 106.

The gasket may be made of any of a variety of elastic materials. Neoprene rubber of a durometer of 60 has been found to perform well. Conduits or terminals passing through the gasket may be attached by appropriate adhesives having some ability to fill any uneven spaces which may occur between the two. Neoprene trowelling compound may be used as well as any of a variety of materials which would be appropriate to those skilled in the art.

Having described the concept of the device, the scope of the invention is defined by the following claims.

What is claimed is:

1. A gasket device for sealing an opening in a chamber wall to prevent the flow of liquid through said opening, said gasket comprising in combination:
   a. a body portion arranged to substantially fill said opening; and
   b. upper and lower tab members of elastic material joined to and extending from said body portion, at least a portion of the edges of said tab members adapted to lockingly cooperate with corresponding recesses in said chamber wall to prevent the flow of liquid past the interface of said edges and said recesses.

2. The apparatus of claim 1 wherein said upper and lower tab members taper to a neck configuration at the juncture of said body portion.

3. The apparatus of claim 2 wherein said gasket is planar and the profile configuration of said tab members is three sided.

4. The apparatus of claim 2 wherein said gasket is planar and the profile configuration of said tab members is four sided.

5. The apparatus of claim 2 wherein said gasket is planar and the profile configuration of said tab members is five sided.

6. The apparatus of claim 1 wherein said body portion has a transverse opening for receiving an electrical conducting member for transmitting electrical energy from one side of said wall to the other.

7. The apparatus of claim 1 wherein said body portion has a transverse opening for receiving a fluid conducting member for transmitting a fluid from one side of said wall to the other.

8. In a filter press electrodialysis apparatus, an electrode support frame and gasket assembly comprising in combination:
   a. a rigid electrode support frame having an opening in one side extending from the interior to the exterior of said frame, said frame further having a pair of recesses one each disposed on opposite sides of said opening; and
   b. a gasket of elastic material comprising:
      1. a body portion arranged to substantially fill said opening; and
      2. a pair of tab members one each positioned on opposite sides of said body portion, said tab members arranged to substantially fill said recesses, at least a portion of the edges of said tab members adapted to lockingly cooperate with the edges of said recesses to prevent fluid flow past said edges from the interior to the exterior of said frame.

9. The apparatus of claim 8 wherein said body portion has a transverse opening for receiving an electrode terminal.

10. The apparatus of claim 9 wherein said gasket and said frame have substantially planar surfaces.

11. The apparatus of claim 10 further including plate means for applying pressure to the planar surfaces of said frame and said gasket.

12. The apparatus of claim 11 wherein each of said tab members forms a neck at the points of juncture of said body portion.

13. The apparatus of claim 12 wherein the profile configuration of said tab members is five sided.

* * * * *